United States Patent [19]
Takahashi

[11] Patent Number: 5,729,509
[45] Date of Patent: Mar. 17, 1998

[54] TRACK CROSSING CONTROL FOR DOUBLE OPTICAL DISK DRIVE DEVICE

[76] Inventor: Hiroshi Takahashi, 17-G- Wisteria Mansion, Taikoo Shing, Hong Kong

[21] Appl. No.: 677,573

[22] Filed: Jul. 8, 1996

[30] Foreign Application Priority Data

Sep. 1, 1995 [FR] France ................. 95 10314

[51] Int. Cl.⁶ ............................................. G11B 17/22
[52] U.S. Cl. ................................... 369/32; 369/215
[58] Field of Search ........................ 369/215, 32, 219, 369/244, 44.28, 44.29, 44.35

[56] References Cited

U.S. PATENT DOCUMENTS

| | | | |
|---|---|---|---|
| 4,835,752 | 5/1989 | Nakatsu et al. | 369/32 |
| 4,964,111 | 10/1990 | Hangai et al. | 369/32 |
| 4,974,222 | 11/1990 | Ishitoya et al. | 369/215 |
| 4,977,554 | 12/1990 | Hangai et al. | 369/32 |
| 5,058,097 | 10/1991 | Suzuki et al. | 369/215 |

FOREIGN PATENT DOCUMENTS

| | | |
|---|---|---|
| 0424978 | 5/1991 | European Pat. Off. |
| 3534529 | 4/1986 | Germany |
| 3638911 | 5/1988 | Germany |
| 63-129858 | 6/1988 | Japan |
| 010587473 | 3/1989 | Japan |

*Primary Examiner*—Tan Dinh
*Attorney, Agent, or Firm*—Spencer & Frank

[57] ABSTRACT

A playback unit includes a control unit (40) adapted to displace, on guide means (2), as a function of commands received from a disc management unit (41), an optical unit (3) equipped with a reproducing and/or writing head (4), between two discs (5-i) each having an information zone (ZL) defined by a start region (DZ) and an end region (FZ). The information zone (ZL) may be a reproducing and/or writing zone. The device likewise includes detection apparatus (16–18, 23, 24, 27, 37, 38) adapted to indicate to the control unit (40) the passage of the optical unit (3) at at least two passage points (47-i, 48-i) respectively associated with positioning of the head (4) substantially facing the end of zone region (FZ) and an intermediate region (RI) of the information zone (ZL) of each disc. The control unit (40) is adapted to vary the speed of displacement of the optical unit (3) as a function of the passage point detected and the commands received, enabling minimization of the time necessary for the optical unit (3) to pass from a track of information on one of the discs to a track of information on the other disc.

12 Claims, 1 Drawing Sheet

TRACK CROSSING CONTROL FOR DOUBLE OPTICAL DISK DRIVE DEVICE

BACKGROUND OF THE INVENTION

The invention relates to a positioning device for a unit equipped with a reproducing and/or writing head for information on a disc, particularly for playback systems for optical discs of the type known by the title Compact Disc.

Such a disc comprises a reproducing and/or writing zone defined by the start and end of a zone, the start of the zone being placed closest to the centre of the disc, and comprising a table of contents relating to the tracks of information contained in the reproducing and/or writing zone, and to their duration.

The invention relates more particularly to twin-loading playback units, in which the user places a first disc on a first horizontal support associated with a first drawer, then a second disc on a second horizontal support associated with a second drawer.

In the case of a playback unit with drawers, the horizontal supports constitute the lower faces of said drawers, which can emerge from the playback unit by executing a horizontal movement.

Once the discs are in position and the drawers have returned to the interior of the playback unit, a disc management unit causes to rotate a first rotating support, forming a turntable, and which has taken the first disc in charge. Then this unit commands guide means to position the reproducing and/or writing unit of the playback unit beneath the table of contents of the first disc, so that said unit can read the information which it contains.

The unit is installed on guide means which are integral with the chassis of the playback unit, and adapted to authorise its displacement between the first and second discs.

When the management unit has finished memorising the information contained in the table of contents of the first disc, it commands the guide means to carry out a reading of the table of contents of the second disc, requiring the rotation of a second rotating support, forming a turntable, then positioning of the reproducing and/or writing unit beneath the table of contents of the second disc.

This positioning must be effected as rapidly as possible so that the user can select the track of his choice on one of the discs, while the other disc is being read, with the minimum loss of time.

As the unit is displaced at high speed, when it arrives at the stop at the end of the guide means, this generates extreme stresses which can involve impairment both of the guide structure and of the unit, this appreciably reducing the performance of the playback unit, which depends in particular on the precision with which the unit is positioned.

In devices known at present, when the user wishes to listen to a selected track of the second disc while he is listening to the first disc, it is firstly necessary to position the reproducing head at the beginning of the reproducing zone of the second disc, then search for the selected track, requiring accelerated reading of all the tracks situated before it.

When the number of the selected track is higher than half the total number of tracks in the reproducing zone, positioning of the unit (or access time) is very long. Consequently the convenience of the user is reduced.

SUMMARY OF THE INVENTION

The object of the invention is to remedy all or part of the disadvantages mentioned above.

The invention has as its particular object a device of the type defined in the introduction, and comprising detection means mounted in the chassis and adapted to indicate to the guide means that the unit is passing at at least a first and a second passage points associated respectively with positioning of the reproducing and/or writing head (occasionally called simply the optical head); substantially facing the end of the zone, and an intermediate region of the reproducing and/or writing zone (occasionally called simply the information zone) of each disc, said intermediate region being comprised between the start region and the end region of the zone. Otherwise, the guide means are adapted to vary the speed of displacement of the unit as a function of the passage point detected, and of commands received from the disc management unit.

This permits the guide means to minimise the necessary time for the reproducing and/or writing unit to pass from a track of information on one of the discs to a track of information on the other disc.

Thus when the management unit knows the content of the table of contents of each disc, it is possible to immobilise the unit at the level of one of the passage points, then to search for the said selected page without necessarily needing to return to the start of the reproducing and/or writing zone. The access time to a track is thus appreciably reduced.

Moreover, under certain conditions of use, such for example as when the management unit does not know the table of contents of the second disc, it is possible to decelerate the speed of displacement of the unit after detection of the passage of the latter in front of one of the passage points, and in particular the second point, in order to avoid stopping the unit abruptly by means of a stop when it is at its maximum speed.

Preferably, according to the invention the detection means are adapted to indicate passage of the unit to a third passage point associated with positioning of the reproducing head in front of a region of each disc comprised between the intermediate region and the start of the reproducing and/or writing zone.

In a particularly advantageous way, the intermediate region is situated at a distance from the centre of a rotating support which is comprised between 34 mm and 44 mm.

In this way it is possible to use the device according to the invention in playback units intended to play back discs in at least two standard formats, such for example as those of 80 mm and 120 mm diameter.

The invention may however also apply to other disc formats, thanks to detection of passage of the unit to the first passage point (end of reproducing zone of a disc of 12 cm format), or at other passage points if required.

According to another feature of the invention, the detection means comprise a plurality of position sensors substantially aligned in a straight line parallel to the guide means and respectively disposed facing at least one passage point, and at least one actuating means adapted to co-operate with the position sensors to permit detection of passage of the unit in front of the point in front of which it is situated.

The detection means may be either of the mechanical type or of the emitter-receiver type, or again of a mixed type. It is possible for example to detect in a mechanical way, and to indicate by emission of an electrical or radio signal.

Preferably, the detection means comprise in addition a plurality of electrical circuits, each connected on the one hand to a detection unit itself connected to the guide means, and on the other hand to one of the position sensors.

Indication of passage received by a sensor is thus converted into an electrical signal, of the current or voltage type, which will be transmitted, via the electrical circuit with which it is associated, to the detection unit which in turn will warn the guide means, which will act accordingly.

In a preferred embodiment, the position sensors are rocker levers comprising first and second ends, each lever forming a switch for a respective one of the electrical circuits, and being adapted to pivot from one to the other of two positions comprising a passive position in which said lever is at rest and the associated electrical circuit is open, and an active position in which the lever has a second end in electrical contact with an electrical terminal of the circuit to which it is connected, said circuit being then closed, and the actuating means is a pin which projects, integral with a lower or lateral face of the unit, substantially parallel to the guide means, and adapted to co-operate by mechanical contact with a first end of a lever in order to cause the latter to pass from the passive into the active position, or vice versa.

In this embodiment, detection is ensured in a mechanical way by co-operation between the unit, through the intermediary of a pin, and a lever forming a switch. Thus, when the lever is forced into its active state, it closes the circuit to which it belongs, causing an electrical current to flow, or a variation in the voltage detected at the level of the detection means.

Advantageously, the rocker levers are respectively mounted to rotate freely about axes directly or indirectly integrated in the chassis, and are each urged towards the passive position by a return member.

Thus, return from the active position to the passive position is automatic, permitting a new detection so to speak instantly.

According to yet another feature of the invention, the disc management unit is adapted, when there is knowledge of the number of tracks of information on each disc, and of a track selected for playback on a given disc, other than the one in the process of being played back, to send to the guide means instructions telling it to shift the unit and to immobilise it just after the second passage point of the given disc.

In this case, the tables of contents of the two discs are known. The reproducing unit can be stopped at the level of the second passage point (close to the centre of a disc of 12 cm format). The search for the track selected by the user can then begin from this second passage point.

To this end, after immobilisation of the unit just after the second passage point of the given disc, the guide means are adapted to control the direction of displacement of said unit as a function of a comparison between the number of the track of the second disc facing the reproducing and/or writing head and the number of the selected track, so that the direction of shift of the optical unit can be determined in view of the position of the reproducing and/or writing head facing the selected track.

According to yet another feature of the invention, the disc management unit is adapted, with knowledge of a track selected for playback on a given disc, and there being no knowledge of the number of tracks of information of the said given disc, to send to the guide means instructions containing a first command to decelerate the speed of displacement of the unit just after detection of its passage in front of the said second passage point of the rotating support containing the given disc, and a second command to stop the unit just after detection of the passage of the latter in front of the third passage point of the rotating support containing the given disc.

In this second case, the first disc is in the process of being played back and the table of contents of the second disc is unknown. It is therefore compulsory to move to the third passage point of the second rotating support, which corresponds to the positioning of the reproducing head at the start of the zone, in order there to read the table of contents. This thereafter enables the search for the track selected by the user.

Otherwise, the fact of being able to decelerate the speed of displacement of the unit before it reaches the stop at the end of the guide means enables it to avoid being abruptly brought to a halt. This eliminates numerous stresses on the device for positioning the reproducing head, which must be as precise as possible.

Other features and advantages of the invention will become apparent upon examining the detailed description which follows, and is provided by way of example.

BRIEF DESCRIPTION OF THE DRAWING

The FIGURE is a diagram, partly opened, of a playback unit equipped with the positioning device according to the invention, in a preferred embodiment.

DESCRIPTION OF THE PREFERRED EMBODIMENT

Figure 1:
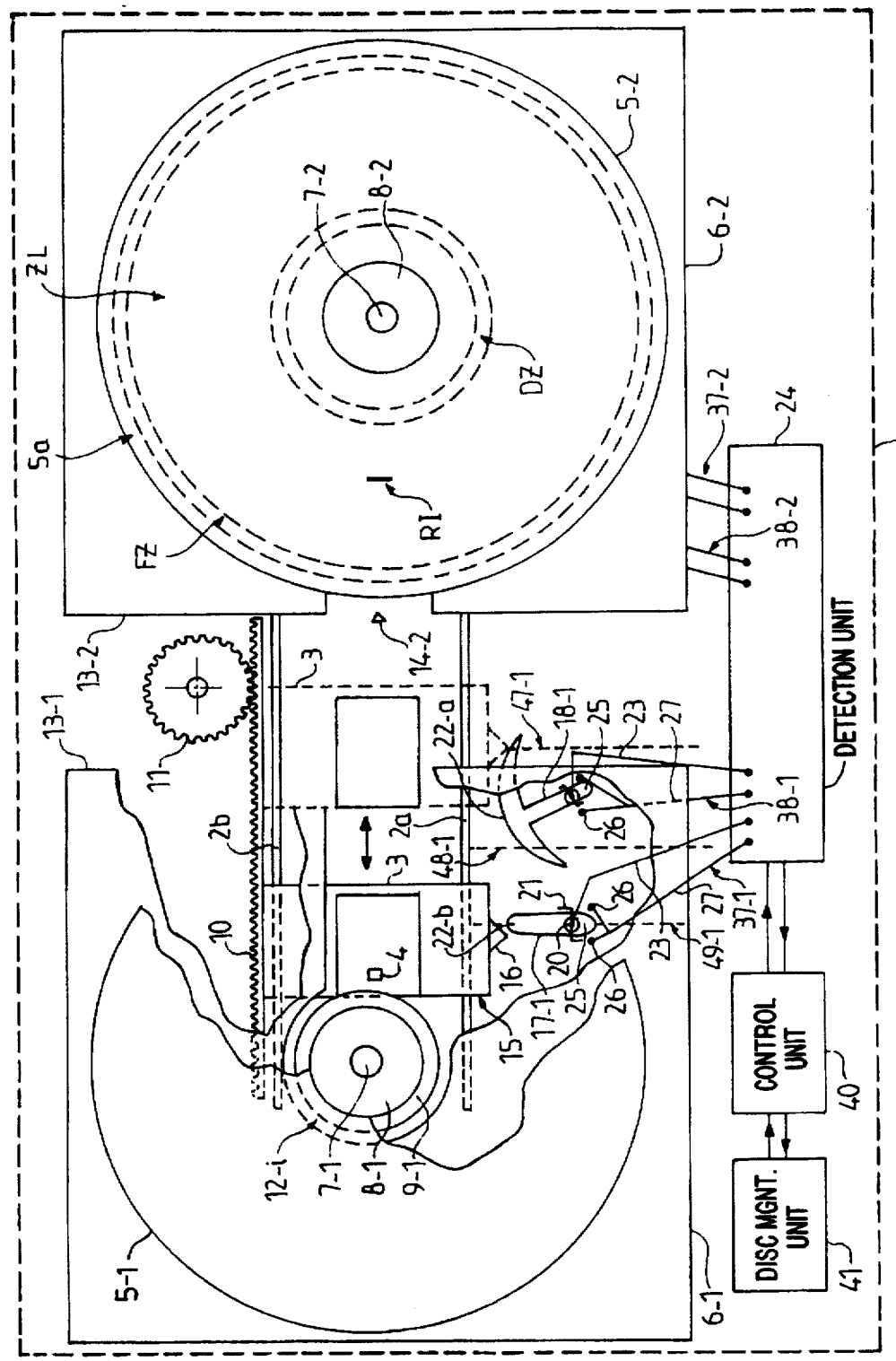

The Compact Disc playback unit or optical disc apparatus partially illustrated in the FIGURE comprises a chassis 1 on the lower face of which there are fixed two rails 2a and 2b. These two rails are parallel in pairs and serve as guide means for an optical unit 3.

This unit 3 is equipped with an optical head such as a reproducing head 4 intended to cooperate with a compact disc by reading information stored in an information zone ZL on the lower face 5a of the compact disc;

The playback unit comprises in a known way first (6-1) and second (6-2) receiving plates upon which there may be respectively manually placed first (5-1) and second (5-2) discs to be played back. Each disc 5-i is positioned, thanks for example to centering means provided on the receiving plate 6-i, in such a way that its vertical axis coincides with a vertical axis 7-i. Each plate 6-i belongs for example to a drawer which can emerge from the playback unit by means of a translatory movement, for manual placing or removal of the disc, and can move back into the playback unit, provided with the disc, in order to occupy the position shown in the FIGURE.

When a drawer is moved entirely into the interior of the playback unit, a rotating support 8-i, forming a turntable associated with the drawer, takes over the disc 5-i which rests on the receiving plate 6-i. The turntable 8-i is equipped with a horizontal plate 9-i extending radially towards the exterior, and intended to support the disc 5-i by contact with a portion of its lower face 5a-i.

Each turntable 8-1 and 8-2 is respectively installed at one of the two ends of the rails 2a and 2b, and is centred between them. The optical unit 3 which is installed on these rails can move in a translatory way, and horizontally, from the first turntable 8-1 towards the second turntable 8-2, or vice versa, depending on the position at any moment of the optical unit 3.

The receiving plates 6-1 and 6-2 are mounted above the rails 2a and 2b and comprise a central aperture 12-i, the diameter of which is greater than that of the horizontal plate 9-i of the turntable 8-i, and which is connected to a free edge 13-i of the receiving plate 6-i by a radial notch 14-i with edges parallel to the two rails 2a and 2b.

The optical unit 3 can thus be displaced horizontally on the rails 2a and 2b so that the reproducing head 4 is facing the lower face 5a-i of the disc 5-i, and covers a region of the latter.

This translatory horizontal movement on the guide rails is obtained by means of a rack 10 integral with the unit 3, co-operating with a pinion 11 rotated by a motor (not shown in the FIGURE).

The unit 3 comprises on one lateral face 15 parallel to the guide rails 2 a projecting pin 16, intended to actuate the rocker levers which will be discussed later.

This pin, however, may be provided on another face, such for example as the lower face of unit 3.

As indicated above, the device according to the invention comprises two pairs of first (18-i) and second (17-i) levers, respectively mounted to rotate freely about axes 20-i integral with the chassis 1, on either side of an axis contained in the plane of the rails 2 and passing between the two discs at an equal distance from their respective centres.

Thus, there are associated with the first disc 5-1 the two rocker levers 17-1 and 18-1, and with the second disc 5-2 the two rocker levers 17-2 and 18-2 (not shown in the FIGURE).

Naturally, in another embodiment, these levers may form part of a casing integral with the chassis 1.

The rocker levers are kept at rest about their axis of rotation 20 by a return member 21, of the helical spring type, in a position termed passive in which the axial central portion of the lever is substantially perpendicular to the rails 2a and 2b.

Each of the levers comprises a central portion terminated by first (22) and second (25) ends. The first end 22 is substantially facing the lateral face 15 equipped with the pin 16, and is intended to co-operate with the latter.

Each first lever 18-i is installed facing at the same time first (47-i) and second (48-i) passage points associated respectively with the positioning of the reproducing head 4 of the optical unit 3 facing the end of the information zone region FZ and an intermediate region RI of the information zone ZL.

The intermediate region RI of a disc is situated at a distance comprised between 34 mm and 44 mm from the centre of the turntable which support it, and preferably 36 mm, which corresponds to the vicinity of the centre of the region zone ZL of a compact disc of 120 mm diameter, or to the vicinity of the end of the reproducing zone of a compact disc of 80 mm diameter.

These first levers comprise a first end 22-a perpendicular to their central portion, positioned at rest substantially parallel to the line which represents the path of travel of the pin 16, and of a substantially elongated and rounded shape so as to co-operate with the pin 16 of the lateral face 15 over the whole distance which separates the first (47) and the second (48) passage points. Thus when the pin 16 moves from a first passage point 47 towards a second passage point 48, it rotates the first end of the first rocker lever facing which it moves, which causes transition of said lever from its passive state to an active state which will be defined later. The first lever 18-i is then kept in its active state during the entire duration of displacement of the optical unit between the first (47) and second (48) passage points. Moving past this second passage point involves return of the first lever 18-i to its passive state, when the displacement is effected from the end of zone region ZF towards the start of zone region DZ, and inversely passage of the first lever 18-i into its active state, when the displacement is effected from the start of zone region DZ towards the end of zone region FZ.

Naturally, if the pin is provided on the lower face of the unit 3, the first ends 22-a of the first rocker levers 18-i are mounted between and beneath the guide rails 2, substantially parallel to the latter.

In the same way, numerous other embodiments may be envisaged for this first end 22-a, provided that each embodiment permits the co-operation described before.

Each second lever 17-i is installed facing a third passage point 49 associated with positioning of the reproducing head 4 of the optical unit 3 facing the start of the information zone region DZ.

These second levers 17-i comprise, at one of the ends of their central portion, a first end 22-b positioned at rest substantially on the line which represents the path of travel of the pin 16, in order to co-operate locally with the latter.

Thus, when the pin 16 reaches the third passage point 49, it rotates the first end 22-b of the second rocker lever 17-i facing which it is situated, causing transition of the second lever from its passive state to an active state which will be defined later.

This second lever 17-i may likewise be made in the form of a simple flexible conductive blade forming a switch.

When all the first and second levers are in the passive position, their respective first ends 22 are substantially aligned on a virtual straight line parallel to the rails 2a and 2b, on the side opposite the rack 10.

Each lever is respectively connected by its central portion to a detection unit 24 through the intermediary of a first electrical cable 23, whereas the second end 25 of each lever is intended to establish an electrical contact with one of the two terminals 26 of a second electrical cable 27 when the lever is actuated by the pin 16.

The detection unit, the two electrical cables and the lever form an electrical circuit which can adopt two conditions, one, termed active, in which it is closed, which is the case when the lever is actuated, and a condition termed passive, which is the case when the lever is not actuated (or is at rest).

Thus, any transition from a passive state to an active state permits passage of an electrical current in the circuit involved. Circulation of the current, or a variation in the difference in potential at the terminals of the circuit connected to the lever is then detected by the detection unit 24 which is then capable of warning a control unit 40, to which it is connected, of the passage of the unit 3 in front of the passage point associated with the lever which is momentarily in its active state.

In the same way, when the lever 18-i passes from the active to the passive state, this indicates to the detection unit that the unit has just passed in front of the second passage point 48.

Thus there is respectively associated with each lever 17-i and 18-i an electrical circuit 37-i and 38-i composed of a first (23) and a second (27) electrical cable.

Use of the two terminals at the end of each electrical cable 27 permits detection of the passage of the unit 3, whatever its direction of displacement on the rails 2.

The control unit 40 is likewise connected, on the one hand, to the drive motor of the pinion 11, which permits it to manage the speed of displacement of the optical unit 3, and on the other hand, to a disc management unit 41.

This management unit 41 is intended to memorise the information relative to the two discs which is located in their respective tables of contents, contained in the start of zone regions DZ of the discs.

These tables of contents generally contain the number of tracks of information on the disc, their respective durations, and the total duration necessary for complete playback of each disc.

The management unit 41 is moreover adapted on the one hand to instruct the control unit to place the reproducing head 4 opposite a given track of one of the discs, and on the other hand to memorise an ordered sequence of tracks selected by the user of the playback unit.

The control unit 40, the detection unit 24 and the management unit 41 are mounted in the playback unit. These three units are preferably constituted by electronic components which the person skilled in the art can find commercially.

The device according to the invention functions in the following manner.

When the playback unit reads a track of one of the discs, for example the first disc 5-1 which is situated on the first turntable 8-1, and the user wishes to listen to a new track on the second disc 5-2, the management unit 41 interrogates the memory in which it stores the tables of contents of each of the loaded discs 5-1 and/or 5-2.

Two situations then arise.

a) There exists a first case, in which the memory of the management unit 41 effectively contains the tables of contents of the first and second discs 5-1 and 5-2.

In this case, the management unit 41 sends instructions to the control unit 40, commanding it to stop the unit 3 just after detection, by the detection unit 24, of passage of this unit 3 in front of the second passage point 48 of the disc support containing the new track to be read. These instructions comprise the number of the said track selected by the user.

Upon receipt of these instructions indicating the need to pass, for example, from the track in process of being read on the first disc 5-1 to the selected page on the second disc 5-2, the control unit 40 commands displacement of the optical unit 3 in the direction of the second disc 5-2.

Passage of the pin 16 in front of the first passage point 47-2 causes rotation of the first lever 18-2 and consequently transition of the circuit 38-2 from the passive to the active state. Then, when the pin 16 passes in front of the second passage point 48, it causes the return of the first lever 18-2 towards its rest position, and consequently transition of the circuit 38-2 from the active to the passive state. As soon as the detection unit 24 detects this latter transition, it warns the control unit 40, which then commands immediate stoppage of the optical unit 3 which is then positioned just after the second passage point 48.

The search for the track selected by the user can commence as soon as unit 3 is immobilised.

The reproducing head 4 must firstly search for the number of the track which it faces, then communicate its number to the control unit 40 which will then carry out a comparison between this track number and the track number selected by the user, in order to ascertain the direction of displacement of the optical unit 3.

Once the selected track has been identified, the control unit 40 immobilises the optical unit 3, and playback of the track of information selected by the user can begin.

In the case of compact discs of 80 mm diameter, only the second and third levers correspond to positions of the reproducing head facing a reproducing zone, the first lever being unutilised. As a consequence, in this particular case, the unit is positioned facing the second passage point 48 and the search for the track selected by the user is carried out automatically in the direction of the centre of the disc involved. It is therefore unnecessary to carry out a subtraction in order to know the direction of displacement of the unit.

b) A second case exists, when the table of contents of the second disc 5-2 is not known by the management unit 41, which can be the case when the second disc has been inserted into the playback unit while the latter was in the process of playing back the first disc 5-1. It is then necessary to read this table of contents of the second disc 5-2 before being able to search for the track selected by the user. This reading involves transfer of the unit to the level of the third passage point 49 of the disc involved.

In order to carry out this operation, the management unit 41 addresses to the control means 40 instructions which contain two commands as well as the number of the track selected by the user.

The first command is a command to decelerate the speed of displacement of the optical unit 3 just after detection of its passage in front of the second passage point 48 of the second turntable 8-2 which contains the second disc 5-2. The second command is a command to stop the optical unit 3 just after detection of its passage in front of the third passage point 49-2 of the second rotating support 8-2.

These two commands thus enable the speed of the optical unit 3 to be appreciably decelerated before it reaches the end of the rails 2a and 2b, the end where there is located a stop (not shown in the FIGURE) which would involve abrupt stoppage of the optical unit 3. Thus, the optical unit 3 does not undergo severe stress when it stops at the start of the reproducing zone DZ of the second disc 5-2.

Upon receipt of the instructions indicating the need to pass from the track in process of being played back of the first disc 5-1 to the track selected by the user, on the second disc 5-2, the control means 40 command the unit to shift in the direction of the second disc 5-2. As soon as the detection unit 24 detects passage of the optical unit 3 in front of the second rocker lever 17-2 (transition of circuit 38-2 from the active to the passive state), it warns the control unit 40, which commands the motor of the toothed wheel 11 to reduce its speed of rotation, which enables deceleration, on command, of the speed of displacement of the unit 3. Then, when the detection unity 24 detects passage of the optical unit 3 in front of the second lever 18-2 (transition of the circuit 37-2 from the passive to the active state), it again warns the control unit 40, which commands the unit 3 to stop just after this second rocker lever 17-2, in order that the latter can regain its passive position.

The second lever 17-i thus acts as a power supply switch for the control unit.

The reproducing head 4 is then located at the start of the information zone region DZ, where it can read the table of contents of the second disc 5-2. After reading this table of contents, the search procedure for the track selected by the user can begin. This procedure is the one used in a known way by all commercially-available playback units. It consists in slowly displacing the optical unit radially from the interior of the disc towards the exterior of the same disc, until the reader head detects the start of the track selected by the user.

Other embodiments, coming within the framework of the following claims, may be envisaged for the detection means, such for example as using position detectors capable of emitting a signal of the electromagnetic-wave type in the direction of the control means, when passage of the unit is detected. This would permit the elimination of electrical coupling circuits between each detector and the control means.

Otherwise the use of position sensors of the emitter-receiver type may also be envisaged. Thus each sensor would emit a wave which would be reflected by the writing and/or reproducing unit, which for this purpose would be equipped with an appropriate wave reflector.

In the same way, each sensor could be divided into two portions respectively installed facing the opposite lateral faces of the unit. The emitter portions, mounted facing the control means, would emit waves which would be picked up by receivers mounted facing the emitter portions, on the other side of the control means. When the unit passes, one of the waves would be intercepted, which would serve as a signal to the control means.

Finally, the device according to the invention may be applied to other readers, such for example as CD-ROM or video-audio disc playback units, which are capable of reading discs of at least three different formats. Furthermore the optical head may be a writing head for writing data into the information zone of optical discs instead of (or in addition to) reproducing data that has previously been stored.

It is also possible to envisage the use of two rocker levers instead of the single first rocker lever, for each turntable, but this would require amendment of the procedure described above and given by way of example. Thus passage in front of a second point would be detected by a transition of the associated circuit from the passive to the active state. In addition, in this other embodiment, there would be no further need to produce a first end in elongated and rounded form for each of the two levers which would replace the first lever described above. Simple levers like the second lever described before would be sufficient in order to detect such a localised transition.

What is claimed is:

1. An improved positioning device for an optical unit (3) in a apparatus having a chassis (1), a first rotatable support (8-1) for a first optical disc (5-1) and a second rotatable support (8-2) for a second optical disc (5-2), a disc management unit (41), and guide means (2) integral with the chassis (1) for permitting displacement of the optical unit (3) between the first disc (5-1) and the second disc (5-2), and control means (40) for causing displacement of the optical unit (3) on the guide means (2) as a function of commands received from the disc management unit (41), each of the optical discs having an information zone (ZL) defined by a start of zone region (DZ) and an end of zone region (FZ) and the optical unit (3) having an optical head (4) to cooperate with the information zones (ZL) of the optical discs, wherein the improvement comprises:

detection means (16–18, 23, 24, 27, 37, 38) mounted in the chassis (1) for indicating to the control means (40) that the optical unit (3) is passing at at least a first (47-i) and a second (48-i) passage points associated respectively with positioning of the optical head (4) substantially adjacent the end of the zone region (FZ) and an intermediate region (RI) of the information zone (ZL) of each disc, said intermediate region (RI) being disposed between the start and the end zone regions, and wherein the control means (40) comprises means for varying the speed of displacement of the optical unit (3) as a function of the passage point detected, and of commands received from the disc management unit (41), so as to minimise the necessary time for the optical unit (3) to pass from a track of information on one of the first and second optical discs to a track of information on the other of the first and second optical discs.

2. A device according to claim 1, wherein the detection means (16–18, 23, 24, 27, 37, 38) further comprises means for indicating passage of the optical unit (3) to a third passage point (49-i) associated with positioning of the optical head (4) adjacent a region of each optical disc between the intermediate region (RI) and the start of zone region (DZ).

3. A device according to claim 2, wherein the intermediate region (RI) of each optical disc is situated at a distance from the centre of the rotating support (8-i) for the respective optical disc which is comprised between 34 mm and 44 mm.

4. A device according to claim 2, wherein the region associated with the third passage point (49-i) is the start of zone region (DZ) of the optical disc (5-i).

5. A device according to claim 1, wherein the detection means (16–18, 23, 24, 27, 37, 38) comprises a plurality of position sensors (17-i, 18-i) substantially aligned in a straight line parallel to the guide means (2) and respectively disposed facing at least one passage point, and at least one actuating means (16) adapted to co-operate with the position sensors to permit detection of passage of the optical unit (3).

6. A device according to claim 5, wherein the detection means (16–18, 23, 24, 27, 37, 38) further comprises a detection unit (24) which is connected to the control means (40), and a plurality of electrical circuits (37-i, 38-i), each connected on the one hand to the detection unit (24), and on the other hand to one of the position sensors (17-i, 18-i).

7. A device according to claim 6, wherein the position sensors (17-i, 18-i) are rocker levers comprising first (22) and second (25) ends, each lever forming a switch for a respective one of the electrical circuits (37-i, 38-i), and being adapted to pivot from one to the other of two positions comprising a passive position in which said lever is at rest and the associated electrical circuit is open, and an active position in which the second end (25) of the lever is in electrical contact with an electrical terminal of the circuit to which it is connected, said circuit being then closed, and wherein the at least one actuating means (16) is a pin which projects, integral with a lower or lateral face (15) of the optical unit (3), substantially parallel to the guide means (2), and is adapted to co-operate by mechanical contact with a first end (22) of a lever in order to cause the latter to pass from the passive into the active position, or from the active position to the passive position.

8. A device according to claim 7, wherein the rocker levers (17-i, 18-i) are respectively mounted to rotate freely about axes (20-i) directly or indirectly integrated in the chassis (1), and are each urged towards the passive position by a return member (21).

9. A device according to claim 1, wherein the disc management unit (41) is adapted, when there is knowledge of the number of tracks of the information on each of the first and second optical discs, and of a track that is selected for playback on a given one of the discs while the other disc is in the process of being played back, to send to the control means (40) instructions telling it to shift the optical unit (3) and to immobilise it just after the second passage point (48-i) of the given one of the discs.

10. A device according to claim 9, wherein, after immobilization of the optical unit (3) just after the second passage point (48-i) of the given one of the discs, the control means (40) controls the direction of displacement of the optical unit (3) as a function of a comparison between the number of the track of the given one of the discs facing the optical head (4) and the number of the selected track, the direction of displacement of the optical unit (3) being determined in view of the position of the optical head (4) facing the selected track.

11. A device according to claim 1, wherein the disc management unit (41) is adapted, when there is knowledge of a track selected for playback on a given one of the first and received optical discs but no knowledge of the number of tracks of information of the given one of the discs, to send to the control means (40) instructions containing a first command to decelerate the speed of displacement of the optical unit (3) just after detection of its passage in front of the said second passage point (48-i) of the rotatable support (8-i) for the given one of the discs, and a second command to stop the optical unit (3) just after detection of the passage of the optical unit (3) in front of a third passage point (49-i) of the rotatable support for the given one of the discs.

12. A device according to claim 11, wherein the instructions sent also comprise the number of the track selected on the given one of the discs.

* * * * *